United States Patent [19]

Rice et al.

[11] 4,335,563
[45] Jun. 22, 1982

[54] COMBINE STONE TRAP LATCH RELEASE

[75] Inventors: Robert L. Rice; Larimer J. Knepper, both of New Holland, Pa.

[73] Assignee: Sperry Corporation, New Holland, Pa.

[21] Appl. No.: 246,983

[22] Filed: Mar. 24, 1981

[51] Int. Cl.³ .............................................. A01F 12/10
[52] U.S. Cl. .................................. 56/10.2; 130/27 JT
[58] Field of Search ....................... 56/10.2, DIG. 15; 130/27 JT, 27 R; 209/82

[56] References Cited

U.S. PATENT DOCUMENTS 3,971,390 7/1976 McDuffie et al. ................... 56/10.2
4,146,038 3/1979 DeBusscher et al. ........... 130/27 JT Primary Examiner—Jay N. Eskovitz
Attorney, Agent, or Firm—Larry W. Miller; Frank A. Seemar

[57] ABSTRACT

A release mechanism for a combine stone trap latch is disclosed wherein the detection of a stone in the crop feed path by either electronic or mechanical detection mechanisms can trigger the release of the latch from a trap door to permit the stone to be ejected from the feed path. The mechanical detection mechanism includes a pinch roller rotatably mounted on a bearing plate above the trap door for movement to selectively vary the distance between the pinch roller and the trap door. A trip link operatively associated with the electronic detection mechanism is pivotally mounted on the bearing plate to maintain a fixed positional relationship between the trip link and a cam member affixed to the pinch roller whenever the pinch roller is positionally adjusted. The release mechanism operatively cooperates with the trip link when the electronic detection mechanism senses a stone in the feed path to unlatch the trap door without the need for adjustment when the bearing plate is moved to adjust the position of the pinch roller relative to the trap door.

10 Claims, 12 Drawing Figures

COMBINE STONE TRAP LATCH RELEASE

BACKGROUND OF THE INVENTION

The present invention relates generally to the detection and ejection of foreign matter from crop harvesting machines and, more particularly, to a release mechanism operatively associated with a trip mechanism for an electronic stone detector to effect the release of a trap door for ejection of the foreign matter from the flow of crop being harvested.

Generally, crop harvesting machines, commonly referred to as combines, include a crop harvesting header mounted at the forward end thereof to initiate the crop harvesting process. Normally, the harvested crop is consolidated within the header and fed to a centrally located conveying mechanism within a feeder housing. From the feeder housing the harvested crop is fed to the combine base unit for further harvesting treatment.

It has been found to be desirable to eliminate non-crop foreign matter from the flow of harvested crop before it reaches the base unit for further harvesting treatment. Foreign matter, including stones, wood and other debris, can be harmful to the harvesting equipment normally housed within the base unit. Combines utilizing the rotary harvesting principal are particularly susceptible to damage from such non-crop foreign matter.

Accordingly, non-crop foreign matter detection devices, commonly referred to as stone traps, have been developed. One such mechanical detection device utilizes a pinch roller mounted a predetermined distance above a trap door in the feeder housing such that the flow of crop passes between the pinch roller and the trap door. Non-compressible matter, such as stones, entering the crop flow between the pinch roller and the trap door and having a height greater than the distance between the roller and the trap door, is forced downwardly against the trap door to force the trap door open and eject foreign matter. Electronic detection devices have also been developed for sensing the presence of such matter and emitting a signal receivable by an ejection mechanism to remove the foreign matter from the flow of crop.

It has been found to be desirable to provide a release mechanism to effect the unlatching of the trap door, whether the foreign matter was detected electronically or mechanically. A trip link, movable by an actuator to be engageable with a cam member affixed to the pinch roller and rotatable therewith, the cam member causing the trip link to engage the release mechanism and effect the unlatching of the trap door, was developed for operative association with the electronic stone detector. However, since the pinch roller and the cam member affixed thereto were positionally adjustable to vary the distance between the pinch roller and the trap door, it was found to be necessary to adjust the components of the release mechanism and the trip link to assure proper cooperation with the cam member to effect the unlatching of the trap door.

SUMMARY OF THE INVENTION

It is an object of this invention to overcome the aforementioned disadvantages of the prior art by providing a combine stone trap latch release utilizing the rotary motion of the pinch roller without the need to be positionally adjusted each time the pinch roller is adjusted.

It is another object of this invention to fix the relative positional relationship between the trip link operatively associated with the electronic detection mechanism and the cam member affixed to the pinch roller by mounting the trip link on the bearing plate with the pinch roller so that adjustment of the pinch roller provides a corresponding movement to the trip link.

It is another object of this invention to provide a release mechanism operatively associated with the trip link for an electronic detection mechanism which does not need to be positionally adjusted upon a positional adjustment of the trip link.

It is still another object of this invention to provide a release mechanism which is operative to pivot a catch member away from a latch member to unlatch a trap door so that the trap door can move to an open position for ejection of non-crop foreign matter from the flow of crop material in a crop harvesting machine.

It is a feature of this invention that the release mechanism is operable to pivotally move the catch and, thereby, unlatch the trap door when non-crop foreign matter is detected by either an electronic detection device or a mechanical detection device.

It is an advantage of this invention that a positional adjustment of the pinch roller does not necessitate a corresponding adjustment of either the trip link or the release mechanism.

It is a further object of this invention to provide additional components in the release mechanism to assist in pivotally moving the catch member to unlatch the trap door.

It is a still further object of this invention to provide a combine stone trap latch release mechanism which is durable in construction, inexpensive of manufacture, carefree of maintenance, facile in assemblage, and simple and effective in use.

These and other objects, features and advantages are accomplished according to the instant invention by providing a release mechanism for a combine stone trap latch wherein the detection of a stone in the crop feed path by either electronic or mechanical detection mechanisms can trigger the release of the latch from a trap door to permit the stone to be ejected from the feed path. The mechanical detection mechanism includes a pinch roller rotatably mounted on a bearing plate above the trap door for movement to selectively vary the distance between the pinch roller and the trap door. A trip link operatively associated with the electronic detection mechanism is pivotally mounted on the bearing plate to maintain a fixed positional relationship between the trip link and a cam member affixed to the pinch roller whenever the pinch roller is positionally adjusted. The release mechanism operatively cooperates with the trip link when the electronic detection mechanism senses a stone in the feed path to unlatch the trap door without the need for adjustment when the bearing plate is moved to adjust the position of the pinch roller relative to the trap door.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
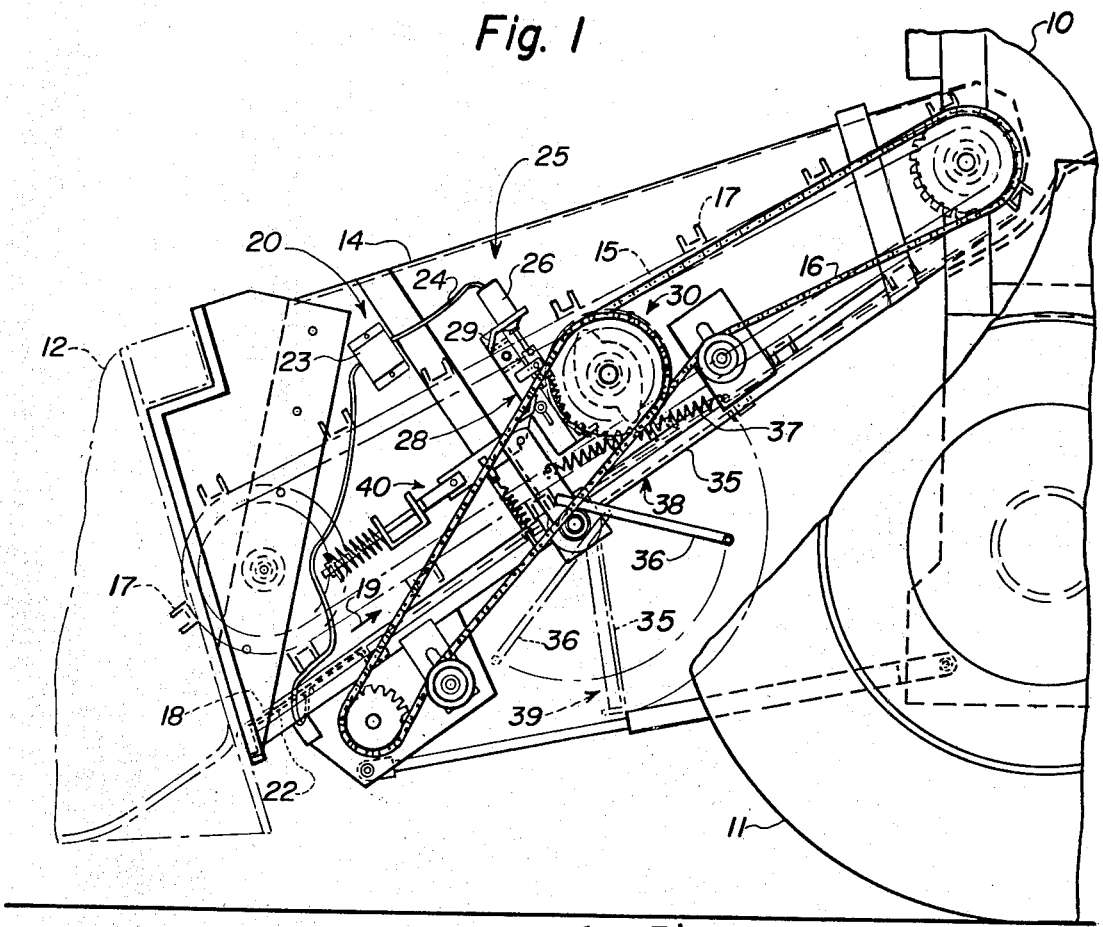
FIG. 1 is a side elevational view of the combine feeder housing incorporating the principals of the instant invention, the combine base unit being shown fragmentally with the front wheel partially removed for clarity, the crop harvesting header being shown fragmentally and in phantom.

Referring now to the drawings and, particularly to FIG. 1, a side elevational view of a feeder housing for a crop harvesting machine, commonly referred to as a combine, can be seen. The combine base unit 10 is mounted on a wheeled frame 11 containing apparatus, not shown, for the harvesting of crop material fed thereto. A forwardly mounted crop harvesting header 12 is conventional in the art and is operable to sever the standing crop, consolidate it and feed it rearwardly to the feeder housing 14, interconnecting the base unit 10 and the header 12 and providing a conduit for conveying crop material to the base unit 10. The feeder housing is generally hollow and houses a crop conveyor 15 driven by the conveyor drive 16 and having lugs 17 thereon for engaging crop material and conveying it along the feeder house floor 18. The direction of the feed path of the crop material along the feeder house floor 18 being shown by the arrow 19.

The electronic detection means 20 includes a sensing plate 22 shown in FIG. 1 as being mounted near the header 12 for early detection of non-crop foreign matter within the feed path. Upon detection of such foreign matter, the control box 23 emits a signal over wire 24 to the actuation means 25, shown in the form of a solenoid 26. The solenoid 26 activates the trip means 28 to cause a subsequent ejection of the foreign matter from the flow of crop material through the feeder housing.

Figure 2:
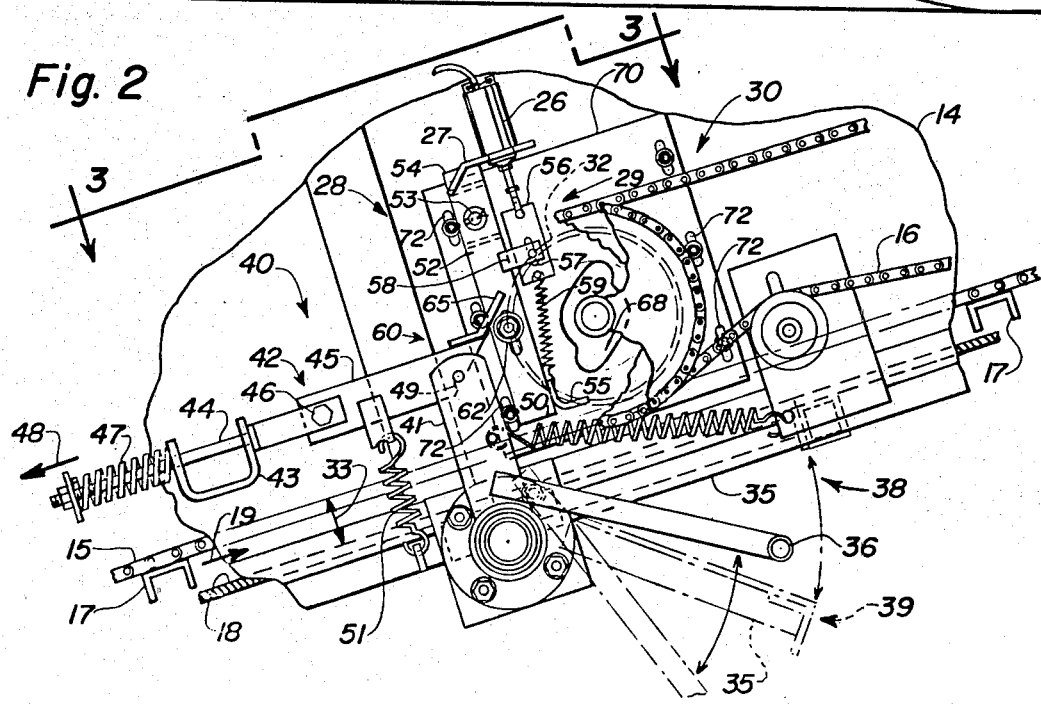
FIG. 2 is an enlarged side elevational view of a portion of the feeder housing of FIG. 1, showing the instant invention, most of the drives having been removed for clarity.
Figure 3:
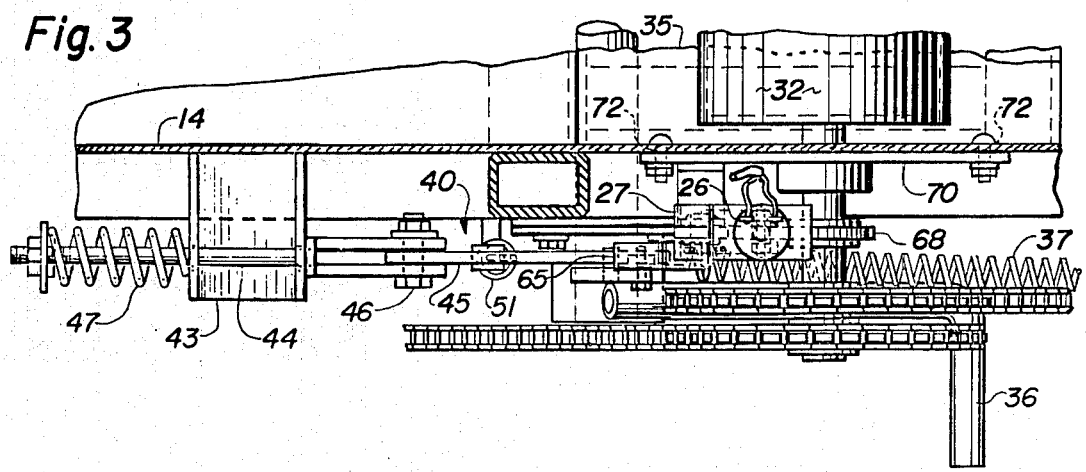
FIG. 3 is a top view of the side of the feeder housing seen in FIG. 2, corresponding to lines 3—3 of FIG. 2.

As can be seen in FIGS. 1, 2 and 3, the mechanical detection means 30 includes a pinch roller 32 mounted at a predetermined distance, indicated by the arrow 33, above the feeder house floor 18. Immediately beneath the pinch roller 32, the feeder house floor 18 includes a trap door 35 pivotally mounted on the feeder house 14 and moveable between a closed position 38, wherein the trap door 35 is contiguous to the feeder house floor 18 to permit crop to flow uninterruptedly, and an open position 39, shown in phantom, wherein an opening is provided in the feeder house floor 18 through which the foreign matter can be ejected from the feed path of the crop material. The trap door 35 includes a handle 36 projecting outwardly from the feeder house 14 for manual manipulation of the door 35 between the closed position 38 and the open position 39. The trap door 35 is shown as being biased toward the open position 39 by means of the spring 37 to provide a positive action for moving it from the closed position 38. However, since the open position 39 is vertically lower than the closed position 38, the trap door 35 could fall into the open position 39 merely by gravity without assistance of the force exerted by the spring 37.

The trap door 35 is held in the closed position 38 by a latching means 40, including a latch member 41 rigidly affixed to the trap door 35 and forming a part thereof to be pivotable therewith. The latching means 40 further includes a latch lock member 42 engageable with the latch member 41 to hold the trap door 35 in the closed position 38. The latch lock member 42 includes a support bracket 43 which slidably receives an elongated bar 44 therethrough. A catch member 45 is pivotally connected to the elongated bar 44 at the pivot connection 46 in line with the major axis of the bar 44. The spring 47 biases the elongated bar 44 for movement in the direction indicated by the arrow 48; however, as is particularly seen in FIG. 2, the elongated bar 44 is of a shape to engage with the bracket 43 and limit the amount of movement thereof in the direction 48. The catch member 45 includes a notch 49 formed therein to enage with the latch member 41 and hold the trap door 35 in the closed position 38. The spring 51 urges the catch member 45 toward engagement with the latch member 41.

The trip means 28, which is operatively associated with the electronic detection means 20, includes a trip link 29 having a first elongated member 52 pivotally connected by a pivot 53 at one end 54 thereof to the feeder house 14, with the remote second end 50 thereof positioned in close proximity to the latching means 40. A stop 55 is provided adjacent the second end 50 of the first member 52 to restrict the amount of movement thereof about pivot 53. A second elongated member 56 is slidably connected via a slot-shaped hole 57 to a bracket 58 which, in turn, is affixed to the first elongated member 52. The second member 56 is connected to the solenoid 26 and is moveable between a passive position, being the normal operating condition in which non-crop foreign matter has not been detected, and an activation position, when foreign matter has been detected by the electronic detection means 20 for effecting the release of the trap door 35 from the latching means 40. The solenoid 26 is affixed to the end 54 of the first member 52 via a mounting bracket 27 and is pivotally moveable with the first member 52 about the pivot 53.

As can be seen in FIG. 2, a spring 59 interconnects the feeder house 14 and the second member 56 to urge the second member into the activation position. With this arrangement, it is contemplated that the solenoid will be operable, when energized, to hold the second member in the passive position. Should a power failure to the solenoid 26 be encountered, the second member 56 would automatically be moved into the activation position and the trap door 35 ultimately moved to the open position 39, thereby signaling the operator of the existence of the power failure. One skilled in the art should readily realize that a solenoid 26 could be provided to push the second member 56 into the activation position when energized. Accordingly, the spring 59 would have to be repositioned to urge the second member 56 into the passive position.

Referring again to FIGS. 1, 2 and 3, a release means 60 is operatively associated with the trip means 28 and the latching means 40 to effect the release of the catch member 45 from the latch member 41. As is best seen in FIG. 2, the release means 60 includes a roller 62 mounted on the first elongated member 52 for adjustment to or away from the pivot 53 and an inclined ramp 65 affixed to the catch member 45 and positioned in close proximity to the roller 62. In operation to effect the unlatching of the trap door 35, the roller 62 and the ramp 65 are caused to be engaged with one another and, as a result, the ramp 65 rides up over the roller 62 causing the catch member 45 to rotate about the catch pivot 46. This movement releases the catch member 45 from the latch member 41 and permits the trap door 35 to move into the open position 39.

A cam member 68 is affixed to the pinch roller 32 and continuously rotatable therewith during operation of the crop harvesting machine. The trip means 28 is positioned such that the second end 50 of the first elongated member 52 is located between the catch member 45 and the cam member 68. The stop 55 prevents the first member 52 from engaging the cam member 68. When the second elongated member 56 is in the passive position, the cam member 68 is not engageable therewith; however, when the second member 56 is moved into the activation position, the cam member 68 contacts the second member 56 and causes the first member 52 to swing about the pivot 53 away from the cam member 68 and toward the catch member 45.

The pinch roller 32 is rotatably mounted on a bearing plate 70 having slot-shaped holes 72 to enable adjustment of the pinch roller 32 relative to the trap door 35, so as to vary the distance 33 therebetween. The first elongated member 52 is pivotally connected to the bearing plate 70 so that the spacial relationship between the second elongated member 56 and the cam member 68 will not vary whenever the position of the pinch roller 32 is changed to adjust the distance 33. However, the roller 62 is adjustable relative to the first member 52 so that the positional relationship between the roller 62 and the inclined ramp 65 can be maintained whenever the position of the pinch roller 32 is adjusted.

Figure 4:
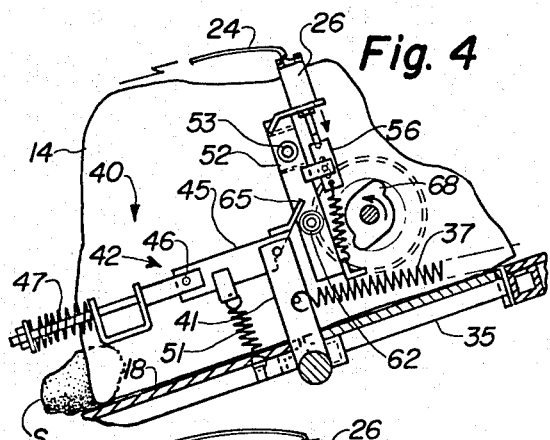
FIGS. 4, 5 and 6 are partial side elevational views of the feeder house corresponding to FIG. 2 and showing the sequential steps of the operation of the instant invention when the foreign matter is electronically detected, the initial step being shown in FIG. 4 and the final ejection of the matter being shown in FIG. 6.
Figure 5:
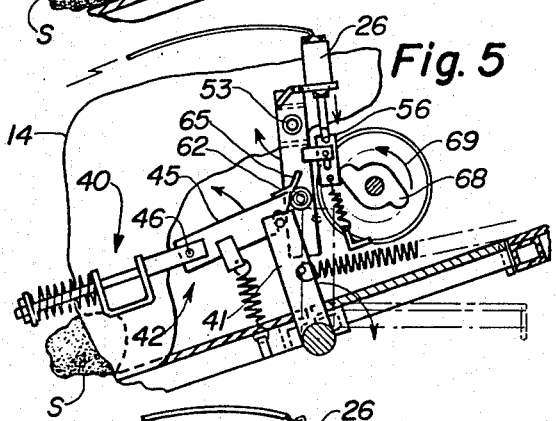
Figure 6:
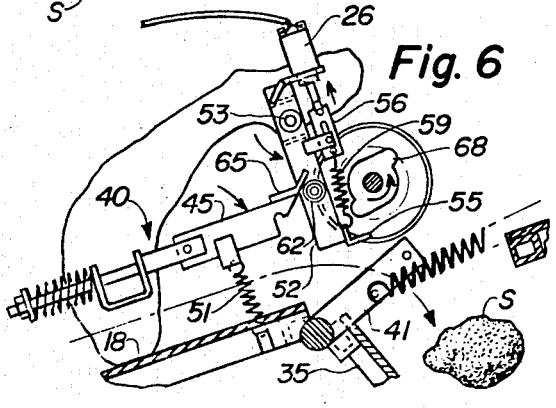

Referring now to FIGS. 4, 5 and 6, the operation of the instant invention to eject a stone having been detected by the electronic detection means 20 can be seen. FIG. 4 depicts the instant invention just as the stone S is being sensed by the electronic detection means 20. The catch member 45 of the latch means 40 is connected to the latch member 41, thereby holding the trap door 35 in the closed position 38 to maintain an uninterrupted flow of crop material. The solenoid 26 is permitting the second elongated member 56 to move from the passive position to the activation position.

In FIG. 5, the second member 56 has moved into the activation position and has been engaged by the cam member 68 rotating in the direction indicated by the arrow 69. The cam member 68 has forced the first member 52 to rotate about its pivot 53, thereby engaging the roller 62 into the inclined ramp 65 on the catch member 45. The engagement between the roller 62 and the ramp 65 causes the catch member 45 to rotate about its pivotal connection 46 with the elongated bar 44, and, as a result, forcing the catch member 45 to disconnect from the latch member 41 as the stone S approaches the trap door 35.

In FIG. 6, the trap door 35 has swung to the open position 39, allowing the stone S to be ejected from the flow of crop material. The solenoid 26 has been re-energized, drawing the second elongated member 56 back into the passive position. This permits the first elongated member 52 to be forced back into its normal position against the stop 55 by the spring 47 biasing the catch member 45 downwardly toward the latch member 41. At this point, it would be necessary for the operator to close the trap door 35, such as through the use of the handle 36, thereby reconnecting the latch member 41 with the catch member 45, to continue with the crop harvesting operation.

Figure 7:
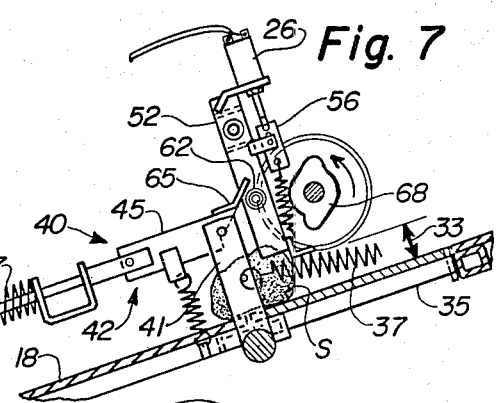
FIGS. 7, 8 and 9 are schematic side elevational views of the instant invention corresponding to FIG. 2 and showing the sequential steps of operation of the instant invention when the foreign matter is mechanically detected, the initial step being shown in FIG. 7 and the final ejection of the matter being shown in FIG. 9.
Figure 8:
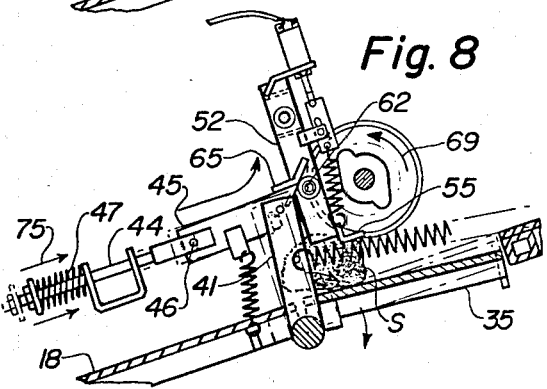
Figure 9:
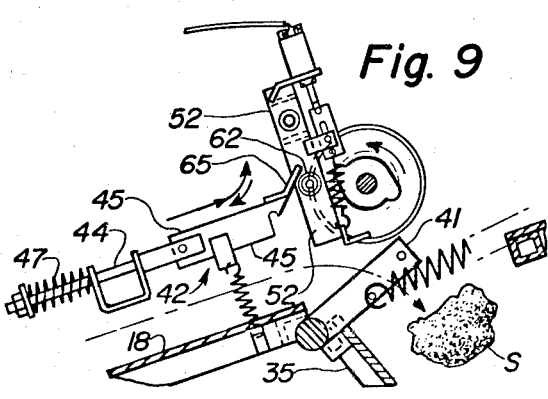

FIGS. 7, 8 and 9 depict the operation of the instant invention to eject a stone upon detection thereof by the mechanical detection means 30. As seen in FIG. 7, all components of the instant invention are in their normal operating position as seen in FIG. 4 and described relative thereto. The stone S has escaped detection by the electronic detection means 20 and is about to become engaged by the pinch roller 32.

In FIG. 8, the stone S passes beneath the pinch roller 32, forcing the trap door 35 to move from the closed position 38 toward the open position 39. This pivotal movement of the trap door 35 causes a corresponding motion in the latch member 41. Since the latch member 41 is still received within the notch 49 in the catch member 45, the elongated bar 44 and catch member 45 are moved substantially linearly in the direction indicated by arrow 75 against the bias imposed by the spring 47. This motion forces the inclined ramp 65 into engagement with the roller 62. Since the stop 55 prevents the first member 52 from rotating toward the cam member 68, the engagement between the roller 62 and inclined ramp 65 forces a pivotal movement of the catch member 45 about its pivot 46 to release the latch member 41 and to permit the trap door to move into the open position 39 as seen in FIG. 9. After the catch member 45 is disconnected from the latch member 41, the spring 47 forces the latch lock member 42 back into its original position. As with the operation of the instant invention described relative to FIGS. 4-6, the trap door 35 must be returned to its closed position 38 to continue the crop harvesting operation.

Figure 10:
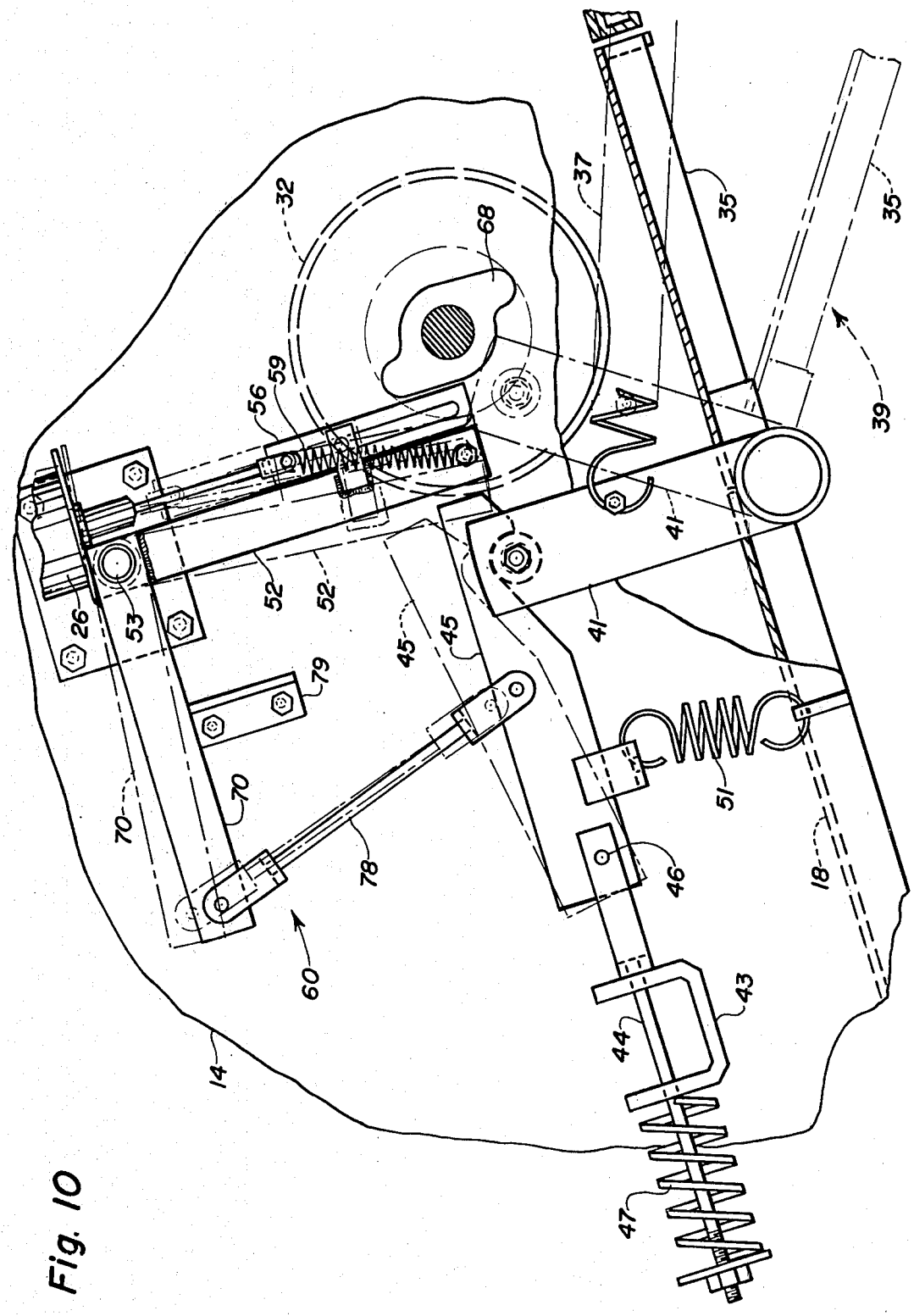
FIG. 10 is a schematic side elevational view of alternative embodiment of the instant invention, showing the operation thereof in phantom upon the electronic detection of the foreign matter.

Referring now to FIG. 10, an alternative embodiment of the instant invention can be seen. The trip means 28, the latching means 40, the solenoid 26, the trap door 35 and the cam member 68 are substantially as described heretofore. The release means 60, however, is comprised of a bell crank 77 rigidly affixed to the first member 52 at right angles thereto and a connecting link 78 interconnecting the bell crank 77 and the catch member 45. The movement of the bell crank 77 toward the catch member 45 is limited by a stop 79. As is shown in phantom, when the cam member 68 engages the second elongated member 56 to cause a pivotal motion of the first elongated member 52 about the pivot 53, the bell crank 77 is rotated therewith. The connecting link 78 effects a corresponding pivotal movement of the catch member 45 about its pivot 46 to disconnect the catch member 45 from the latch member 41.

Similar to that described above in reference to FIGS. 7, 8 and 9, when the pinch roller 32 forces foreign matter downwardly against the trap door 35, the latch member 41 pulls the latch lock member 42 toward the cam member 68. Since the connecting link 78 is of a fixed length and the bell crank 77 is prevented from movement toward the catch member 45 by the stop 79, the catch member 45 pivotally moves about its pivot 46 when it moves linearly toward the cam member 68 to effect the release of the latch member 41 and permit the trap door 35 to move into the open position 39. As noted above, to maintain the proper orientation between the release means 60 and the latching means 40, the length of the connecting link 78 would be adjustable to compensate for any adjustments to the position of the pinch roller 32.

Figure 11:
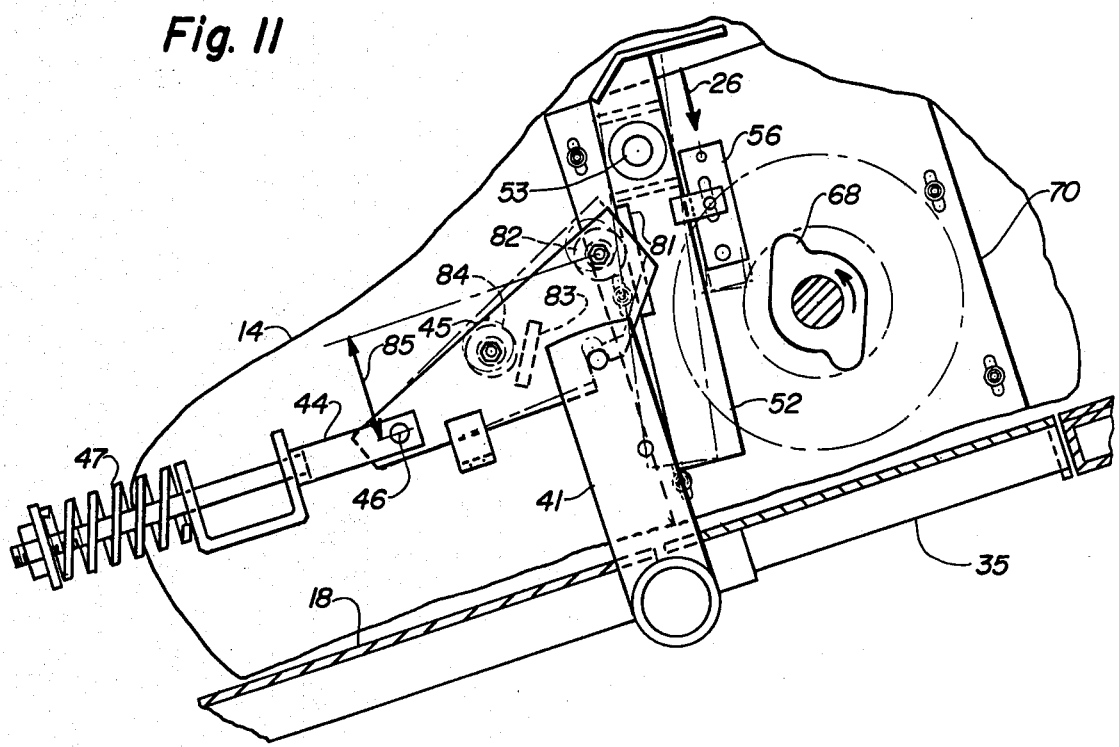
FIG. 11 is a schematic side elevational view of another alternative embodiment of the instant invention showing the operation thereof in phantom upon the electronic detection of the foreign matter.
Figure 12:
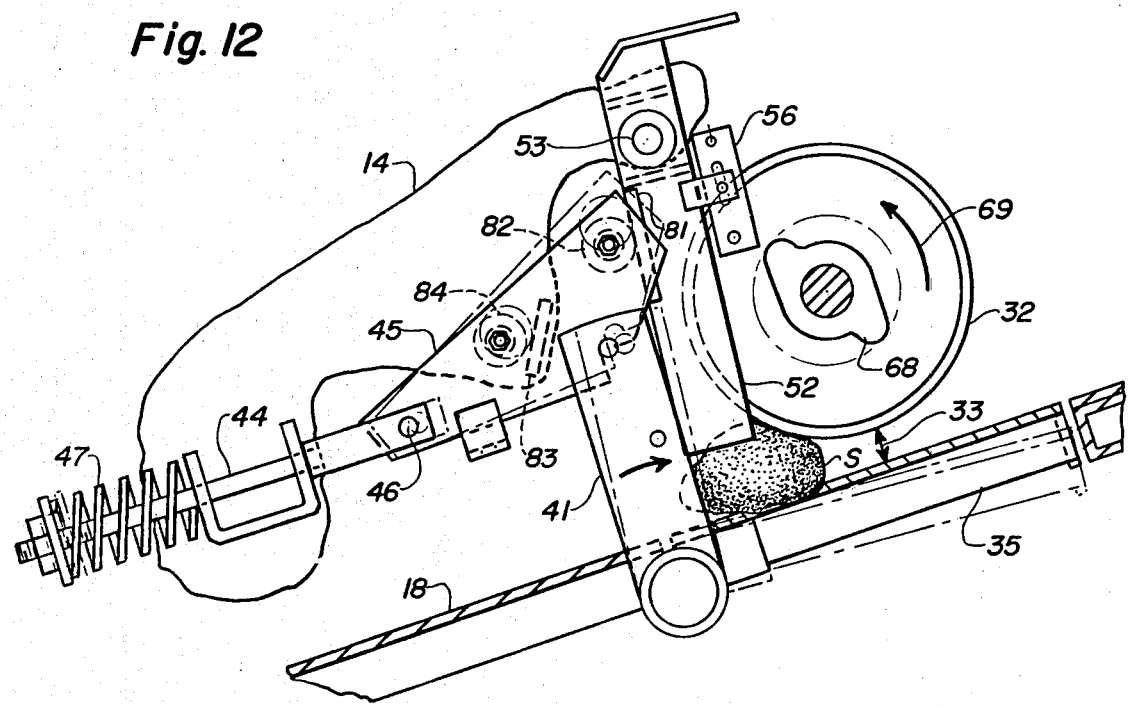
FIG. 12 is a schematic side elevational view of the alternative embodiment of the instant invention shown in FIG. 11, showing the operation thereof in phantom upon the mechanical detection of the foreign matter.

Referring now to FIGS. 11 and 12, another alternative embodiment of the instant invention can be seen. The trip means 28, the latching means 40, the trap door 35, the solenoid 26 and the cam member 68 are substantially as described above in reference to FIGS. 1-9. However, the release means 60 is comprised of a flange 81 projecting outwardly from the first elongated member 52 and a first roller 82 mounted on the catch member 45 in close proximity to the flange 81. To provide additional assistance to the operation described below, the release means 60 could also include an inclined ramp 83 affixed to the feeder house 14 and a second roller 84 mounted on the catch member 45 forward of the inclined ramp 83.

The operation of the release means 60 upon detection of non-crop foreign matter by the electronic detection means 20 is depicted in FIG. 11. When the cam member 68 engages the second elongated member 56, thereby rotating the first member 52 about its pivot 53, the flange 81 engages the roller 82. Because the roller 82 is not mounted in axial alignment with the major axis of the elongated bar 44, the resultant moment arm, relative to the pivot 46 as indicated by the arrow 85, effects a pivotal movement of the catch member 45 about its pivot 46 to release the latch member 41 and permit the trap door 35 to move into the open position 39.

The operation of the release means 60 upon the mechanical detection of non-crop foreign matter is depicted in FIG. 12. As described with respect to FIGS. 7-9, the movement of the trap door 35 toward its open position 39 causes the catch member 45 to move rearwardly toward the cam member 68. As a result of this movement, the roller 82 engages the flange 81 to cause a pivotal movement of the catch member 45 as described above relative to the electronic detection of the foreign matter. An advantage to this particular configuration is that adjustment of the bearing plate 70 to vary the distance 33 between the pinch roller 32 and the trap door 35 does not necessitate a corresponding adjustment of any of the other components in the release means 60.

As noted above, the catch member could include a second roller 84 engageable with an inclined ramp 83 affixed to the feeder house 14 to assist in pivotally moving the catch member 45 about its pivot 46 upon the mechanical detection of non-crop foreign matter. When the catch member 45 moves toward the cam member 68, the roller 84 rides up over the ramp 83 similar to the relationship described above relative to roller 62 and ramp 65. One skilled in the art will readily realize that a slight rearrangement of the position of the pivot 53 and the stop 55, such that the flange 81 would be inclined similar to the ramp 83, could also assist in effecting the pivotal movement of the catch member 45.

It will be understood that there is changes in the details, material, steps and arrangement of parts which have been described and illustrated and explained in the nature of the invention, will occur to and may be made by those skilled in the art upon a reading of the disclosure within the principals and scope of the invention. The foregoing description illustrates the preferred embodiment of the invention. However, concepts as based upon such description, may be employed in other embodiments without departing from the scope of the invention. Accordingly, the following claims are intended to protect the invention broadly as well as in the specific form shown.

Having thus described the invention, what is claimed is:

1. In a crop harvesting machine having a feeder house through which harvested crop is conveyed along a feed path, said feeder housing including an electronic non-crop foreign matter detection means for detecting the presence of non-crop foreign matter in said crop feed path and emitting a signal to indicate said detection; a trap door mounted on said feeder housing below said feed path for movement between a closed position in which crop material can move uninterruptedly along said feed path and an open position in which non-crop foreign matter can be ejected from said feed path; latching means for releasably holding said trap door in said closed position; release means operatively associated with said latching means to disconnect said latching means from said trap door and permit said trap door to move to said open position; a pinch roller rotatably mounted on said feeder housing a predetermined distance above said trap door such that said feed path passes between said pinch roller and said trap door, said pinch roller being adjustably mounted for selectively varying said predetermined distance; a cam member affixed to said pinch roller and rotatable therewith; a trip link mounted on said feeder housing for operatively cooperating with said release means to effect the release of said trap door from said latching means, said trip link being moveable between a passive position and an activation position in which said trip means is engageable with said cam member, the engagement of said cam member with said trip link causing an operative cooperation between said trip link and said release means to effect the release of said trap door from said latching means; actuation means connected to said trip link for moving said trip link from said passive position to said activation position upon the reception of the signal from said electronic detection means; and drive means for rotating said pinch roller during operation of said crop harvesting machine, the improvement comprising:

a bearing plate rotatably mounting said pinch roller and said cam member, said bearing plate being adjustably attached to said feeder housing to move said pinch roller relative to said trap door and selectively vary said predetermined distance, said trip link being mounted on said bearing plate so that the positional relationship between said trip link and said cam member when said trip link is moved into said activation position does not change when said bearing plate is adjusted to vary said predetermined distance; and said release means including an elongated flange member affixed to said trip link projecting outwardly away from said feeder housing and a first roller connected to said latching means adjacent to said flange member, said cam member being operable when said trip link is moved to said activation position to engage said flange member with said first roller to effect the release of said trap door from said latching means.

2. The crop harvesting machine of claim 1 wherein said latching means includes a support bracket affixed to said crop harvesting machine, an elongated bar slidably received within said support bracket, a catch pivotally connected to said bar and connectable to said trap door to releasably hold said trap door in said closed position, said catch being operatively associated with said release means, a biasing mechanism to urge said elongated bar in a biased direction to assist said catch in holding said trap door in said closed position, and a limit means affixed to said elongated bar to limit the amount of movement of said bar in said biased direction, said elongated bar having a major axis defining the line of slidable movement thereof, said catch being pivotally connected to said bar along the line of said major axis.

3. The crop harvesting machine of claim 2 wherein said release roller is connected to said catch remotely of the line of said major axis of said elongated bar, such that when said roller engages said flange member a moment is created to pivotally move said catch about said pivotal connection on said elongated bar.

4. The crop harvesting machine of claim 3 wherein said flange member has a length dimension parallel to the line of movement of said pinch roller relative to said trap door to vary said predetermined distance, said bearing plate having a plurality of slot-shaped holes therein providing finite limits to the amount of adjustable movement of said pinch roller relative to said trap door, the length dimension of said flange member being at least as great as the amount of adjustable movement permitted to said bearing plate.

5. The crop harvesting machine of claim 4 wherein said trip link includes a first elongated member having a first end pivotally connected to said bearing plate and a remote second end positioned between said catch and said cam member, said trip link further including a second elongated member slidably connected to said first member and moveable by said actuation means between said passive position and said activation position, said cam member being operable to rotate said first and second members about said first member pivot when said second member is moved into said activation position, said flange member being affixed to said first elongated member, said trip link further including a stop affixed to said bearing plate to prevent said first elongated member from engaging said cam member.

6. The crop harvesting machine of claim 5 wherein said trap door includes a latch member connectable to said catch member to releasably hold said trap door in said closed position, said pinch roller being operable to force material in said feed path and having a height greater than said predetermined distance downwardly towards said trap door to force said trap door toward said open position, said latch member moving in a second direction generally opposite of said biased direction, said latch member being operable to move said catch in said second direction against said bias to engage said first roller with said flange member, the engagement between said first roller and said flange member causing pivotal movement of said catch about the pivotal connection thereof with said elongated bar to disconnect said catch from said latch member and permit said trap door to move into said open position.

7. The crop harvesting machine of claim 6 wherein said catch includes a second roller mounted thereon, said feeder housing including an inclined ramp extending outwardly therefrom adjacent to said second roller, said second roller being engageable with said inclined ramp when said catch is moved in said second direction by said latch member to assist in effecting the pivotal movement of said catch about the pivotal connection thereof with said elongated bar.

8. The crop harvesting machine of claim 6 wherein said stop is positioned relative to said first member pivot to position said flange member in a rearwardly inclined position when said second member is in said passive position, said inclined flange member being engageable with said first roller to effect a pivotal movement of said catch about its pivotal connection with said elongated bar.

9. The crop harvesting machine of claim 6 wherein said actuation means comprises a solenoid connected to said second member and operatively associated with said electronic detection means.

10. The crop harvesting machine of claim 9 wherein said trap door is biased towards said open position by a spring interconnecting said latch member and said feeder housing.

* * * * *